United States Patent
Demozzi et al.

(10) Patent No.: US 10,048,110 B2
(45) Date of Patent: Aug. 14, 2018

(54) LOADING PLATE FOR WEIGHING SYSTEMS OF VEHICLES IN MOTION AND RELATED CONSTRAINT SYSTEM

(71) Applicant: IWIM SRL, Trento (IT)

(72) Inventors: Andrea Demozzi, Trento (IT); Michele Arturo Caponero, Marino (IT)

(73) Assignee: IWIM S.R.L., Trento (IT)

( * ) Notice: Subject to any disclaimer, the term of this patent is extended or adjusted under 35 U.S.C. 154(b) by 99 days.

(21) Appl. No.: 15/318,883

(22) PCT Filed: Jun. 16, 2015

(86) PCT No.: PCT/IB2015/054552
§ 371 (c)(1),
(2) Date: Dec. 14, 2016

(87) PCT Pub. No.: WO2015/193815
PCT Pub. Date: Dec. 23, 2015

(65) Prior Publication Data
US 2017/0146384 A1    May 25, 2017

(30) Foreign Application Priority Data

Jun. 18, 2014  (IT) .............................. VE2014A0036

(51) Int. Cl.
G01G 21/22  (2006.01)
G01G 19/02  (2006.01)

(52) U.S. Cl.
CPC ........... *G01G 19/022* (2013.01); *G01G 21/22* (2013.01)

(58) Field of Classification Search
USPC ....................................................... 177/133
See application file for complete search history.

(56) References Cited

U.S. PATENT DOCUMENTS

| | | | | |
|---|---|---|---|---|
| 4,560,016 A | * | 12/1985 | Ibanez | G01G 19/03 177/132 |
| 5,260,520 A | * | 11/1993 | Muhs | G01G 19/03 177/1 |
| 6,405,141 B1 | * | 6/2002 | Carr | G01B 5/28 702/158 |

(Continued)

FOREIGN PATENT DOCUMENTS

| DE | 22 63 145 A1 | 6/1974 |
|---|---|---|
| EP | 2 372 322 A1 | 10/2011 |

*Primary Examiner* — J M Saint Surin
(74) *Attorney, Agent, or Firm* — R. Ruschena Patent Agent, LLC

(57) ABSTRACT

The field of application of present invention relates to weighing systems of vehicles in motion also called WIM systems (Weigh In Motion).

The indicated WIM system foresees the placement of a metal plate to the street level, above which vehicles to be weighed may transit, and this metal plate, which is also called loading plate, is mounted above a cavity obtained on the road surface so that it can flex at the passage of the vehicles above it.

The system provides that the measurement of the deflection of said loading plate is carried out with the aid of suitable sensors, and that the estimated weight is obtained through the modeling of the flexing of said loading plate depending on the weight of the vehicle passing over.

The invention discloses a particularly advantage configuration to achieve a weighing system that can be modelled with the required accuracy.

8 Claims, 5 Drawing Sheets

(56) References Cited

U.S. PATENT DOCUMENTS

| | | | | |
|---|---|---|---|---|
| 8,156,802 B2* | 4/2012 | Werber | ............... | G01L 1/26 |
| | | | | 73/159 |
| 8,736,458 B2* | 5/2014 | Reynolds | ............ | G01G 19/024 |
| | | | | 116/31 |
| 9,121,747 B2* | 9/2015 | Mian | ............... | G01G 19/047 |

* cited by examiner

LOADING PLATE FOR WEIGHING SYSTEMS OF VEHICLES IN MOTION AND RELATED CONSTRAINT SYSTEM

BACKGROUND OF THE INVENTION

1. Field of the Invention

The field of application of present invention relates to weighing systems of vehicles in motion also called "WIM systems" (Weigh In Motion).

2. Brief Description of the Prior Art

The weight of the vehicles is a very interesting piece of information in many applications and its knowledge is of great importance.

The most common methods for the weighing of vehicles consist in a static weighing: the vehicle stands above a weighing scale, it is stationary, and the weighing scale, which dimensions are sufficiently large, provides a weight measure.

It is clear that the static weighing procedures are processes that, although they can achieve high accuracy, they cannot be applied in all contexts in which it would be necessary to know the weight of a vehicle. The main limitations are in the slowness of the procedure and in the fact that the "cooperation" by the driver of the vehicle is necessary, since he must go to position his vehicle precisely above the weighing scale. It is clear that applications for the identification of vehicles that circulate overweight, or applications aiming to calculate the amount of a toll according to the weight of the vehicle, are all applications for which the methods based on static weighing are not suitable.

The known art, therefore, also offers other weighing methods which allow to determine the weight of a moving vehicle to its passage over an appropriate dynamic weighing system. Such systems, commonly called "WIM systems", have the major drawback that do not reach as high precision as static weighing systems and, above all, they have operating limits defined by a certain maximum speed of transit.

Said WIM systems would have a wider application if it were possible to increase the accuracy and the maximum speed of transit within which the measurement of weight is reliable.

Some known WIM systems are made by positioning a metallic plate at the street level and vehicles to be weighed pass above that. Such a metallic plate, also called "loading plate", is mounted above a cavity obtained on the road surface. In this way, said cavity is covered so as to offer a substantially continuous plane formed by the road surface and the upper surface of said loading plate over which the vehicles transit.

When a vehicle passes over said loading plate, the latter deforms being able to bend toward the underlying cavity. The deformation of the plate is evidently more accentuated the more heavy is the vehicle that passes over it.

There are several ways to measure the deformation of the plate, however, it is not easy and immediate to correlate the weight of the vehicle that has passed over the plate to the deformation undergone by the plate itself because there are many variables that determine said deformation. Hence, substantially, the difficulty for these WIM systems to achieve high measurement accuracy.

A very efficient way to obtain a measure of the deformation of any object, whereby also the deformation of a metallic plate, is to use a FBG sensor (Fiber Bragg Grating).

In short, said FBG sensors exploit a property of the optical fibers that can be processed so as to form a segment that internally behaves as a "Bragg grating". A fiber behaving as a "Bragg grating" can be used as a sensor of deformation; in fact a "Bragg grating" has the property of reflecting, very selectively, a particular wavelength, when it is invested by a broadband radiation. If, however, the fiber with the "Bragg grating" is deformed, the "Bragg grating" obtained inside said fiber is deformed accordingly and, as a result, the frequency of reflection of the grating itself is varied too.

Thus, a FBG sensor is essentially a segment of optical fiber processed so as to behave as a "Bragg grating": in fact transmitting a broadband optical signal over an optical fiber with a "Bragg grating", and measuring the frequency of reflection, a measurement related to the deformation of the fiber itself can be obtain.

Ultimately, associating to a body that can be deformed, some FBG sensors on which it is possible to transmit a broadband optical signal and performing the measurements of the wavelength that is reflected by the FBG sensor, it is possible to derive a FBG-signal which is related to the deformation undergone by the body at the point where sensor FBG is applied.

Thanks to said FBG sensors that can be applied in several points of a metallic plate used to make a WIM system, it is possible to derive a multiple FBG-signal composed of a set of elementary signals. Each of said elementary signals is a function of time. The number of elementary signals corresponds to the number of sensors associated to said metallic plate and the variability over time depends on the fact that a vehicle takes time to pass above said metallic plate by producing a deformation varying in time. Said multiple FBG-signal is related to the deformation of the plate and thus provides a measure of deformation.

In addition to the FBG sensors, other technologies allow to obtain a signal related to the physical deformation of a solid body. The application of FBG sensors is shown, in this case, as the preferred solution and, in the following, the invention presented in this description will often make reference to said FBG sensors; however, any sensor able to provide a signal related to the deformation of a loading plate can be used for the implementation of the concepts taught in the present invention.

In conclusion, we can state that the deformation undergone by a loading plate, when a vehicle passes there over, can be measured.

In order to synthetize a numeric measure of the weight of a vehicle that, passing above said metallic loading plate, deforms it, it is necessary to use numerical models that describe the deformation of said plate as a function of applied stress. Moreover, those models should be as accurate as possible in order to go back to a sufficiently precise measure of weight.

Therefore, there is a technical problem in providing a WIM system in which the mathematical model that describes the deformation of a plate, caused by the stresses produced by the transit of a vehicle above it, is the most simple and corresponding to reality.

In order to model the deformation of the loading plate in an accurate and realistic way, it is convenient that said loading plate is fixed to the ground by means of a simple support on the edges of the plate itself, and the deformations are just caused by weight forces applied at intermediate points between the supports.

In addition to the easiest mathematical modeling, the simple support presents additional advantages in that the resulting FBG-signals, for effect of the deformations of the plate, have a more simple and less noisy shape. Furthermore, it can be conceived a system whose overall deformations, occurring during the weighing processes, have repeatable characteristics which remain uniform over time.

Other types of constraint (for example with pinouts burdened by the weight of the vehicles or hinges of various types) are certainly more subject to wear out and they would compromise the repeatability of the measurements with the required accuracy.

The simple support presents the obvious limit that it is a constraint only in respect of vertical stress; therefore, it is necessary that also the horizontal forces are compensated as much as possible avoiding abrupt horizontal displacements and bumps, due to the locking of the plate, along horizontal directions.

SUMMARY OF THE INVENTION

Therefore the main purpose of the present invention is to conceive a WIM system made with a loading plate, associated with one or more FBG sensors (or other sensors sensitive to the deformations of a plate), bound to the other parties of said WIM system in such a way that the constraint is similar to a simple support and in which the weight forces deforming said loading plate only act at intermediate points between the supports.

A further purpose of the present invention is to conceive a WIM system in which a loading plate is constrained in such a way that the constraint allows counterbalancing as more as possible the horizontal stress to which said plate is subjected at the passage of a vehicle above. It has to be taken into account that the horizontal stresses are the more significant the higher is the transit speed of the vehicle to be weighed above the loading plate.

Typically, in the prior art systems, it is necessary to firmly fasten the weighing plate to the ground where the vehicles to be weighed pass, but said loading plates are normally placed in a manner that does not allow an adequate accuracy of modeling. In fact, the bond must be sufficiently firm to prevent that the loading plate can be easily removed and to prevent that the system of constraints changes in time requiring frequent calibration of the WIM system (assuming that a recalibration is possible and that it is possible to model a system which may be frequently modified as a result of strong and random forces due to the fast passage of heavy vehicles).

The intended purposes for this invention are achieved through the use of a loading plate of rectangular shape in which the two longer sides are of sufficient size to cover the entire width of the way which the vehicles to be weighed can pass through, and characterized in that the bottom face is flat and wider than the upper face, and in that said loading plate is constrained by a simple support along the long edges of the lower face and in that the vertical projection of the upper face to the lower face does not intersect areas of the lower face in which said loading plate is supported. Furthermore said loading plate is constrained to the transit plane by means of coupling elements fixed to the transit plane itself and forming, at the top, a continuous plane formed by the transit plane, by said coupling elements and by the upper face of said loading plate.

The main advantage of the present invention is that a loading plate for a WIM system realized according to the teachings of the present invention, and bound to the WIM system as described, fulfills the main purposes for which it has been conceived.

BRIEF DESCRIPTION OF THE DRAWINGS

This invention also presents other advantages that will be better and further described in the following description, in the appended claims which make an integral part of the description itself and by the illustration of some practical embodiments described as a way of non-limiting examples in what follows and in the accompanying drawings in which:

DETAILED DESCRIPTION OF THE PREFERRED EMBODIMENTS

Figure 1:
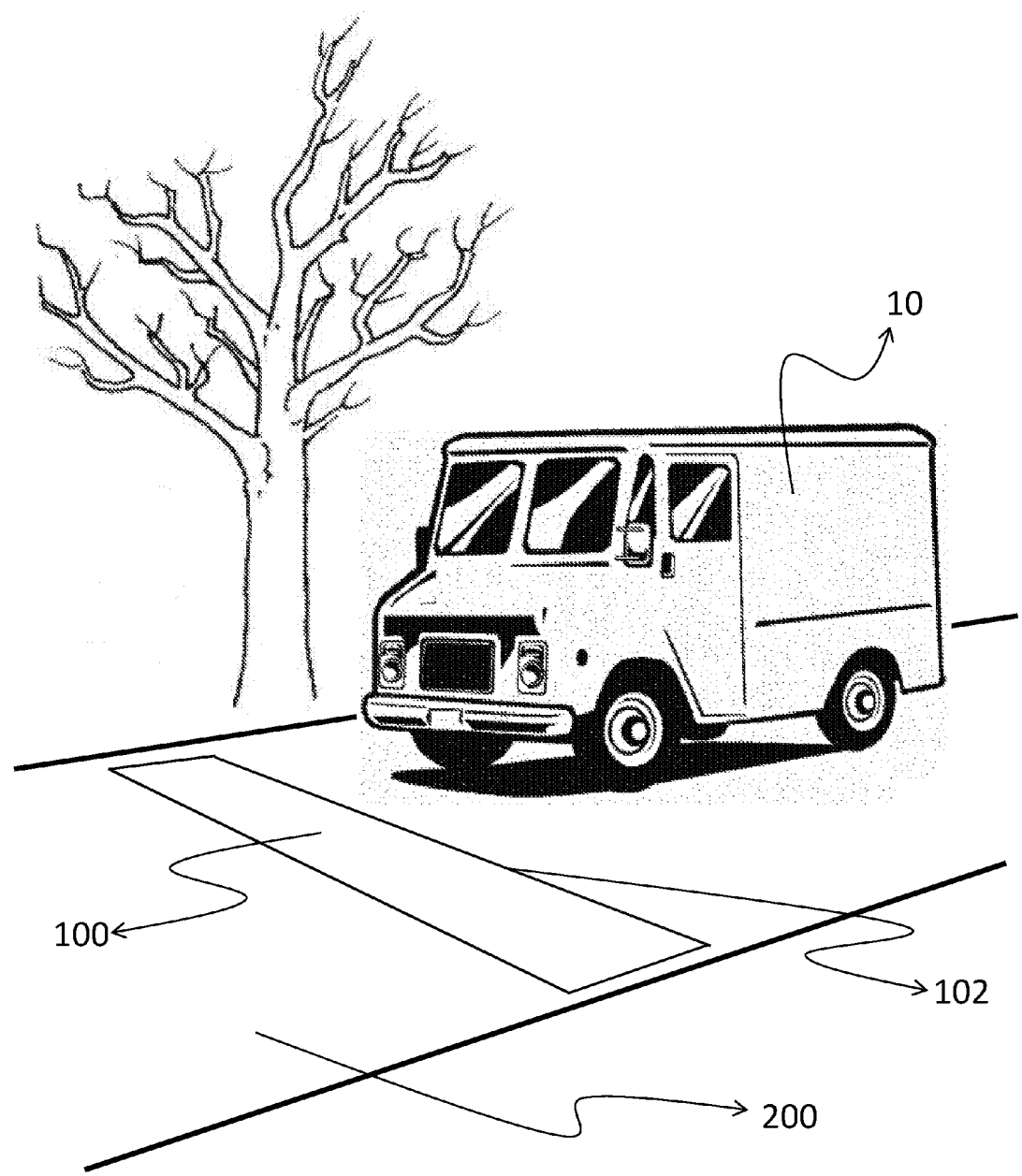
FIG. 1 shows a scene in which the weighing of a moving vehicle can take place.

In FIG. 1 a scene that allows to understand how WIM system operatively works is represented. Under number 10 a vehicle that is moving in a street is shown. With the number 200 is represented the road surface that, for the good operation of the WIM system, should be as uniform and horizontal as possible. The number 100 indicates the WIM system, which occupies a strip placed transversely across the route so that the vehicles pass over it with all their wheels. As can be seen also in the scene of FIG. 1, the WIM system 100 forms a continuous plane with the roadway 200, and the vehicle 10, passing above, must not sense unevenness or steps. Again, FIG. 1 shows as the vehicle 10 accesses the area occupied by the WIM system 100 crossing a long side of the upper surface of said WIM system 100: the number 102 indicates an access side of said WIM system 100.

The WIM systems 100 according to the invention can be optimized both for making measurements of weight of vehicles transiting in a single direction, i.e. entering over the WIM system always from the same access side, and they can be designed to perform measures of weight of vehicles that transit in both directions.

The essential features described in the present invention can be applied to WIM systems able to perform measurements of weight on vehicles passing in both directions. Therefore it is clear that both the two long sides of the WIM system are crossed by vehicles passing over, first to access the system and then to leave it after they have passed over. For convenience, being the characteristics of the two sides equal, in the following of the present description the wording "access side" will be always used, knowing that in addition to referring to the side through which the vehicles have access to the weighing system, they are also sides through which said vehicles leave the system.

In general, the shape of the upper surface of said weighing systems WIM 100 is rectangular and the long side is also the access side 102. In fact said access side 102 must be at least as long as the width of the vehicles that the overall system must be able to weigh. Typically, it is much longer because it must be able to cross the entire width of the space over which the vehicles can transit (usually the length of the access side 102 is on the order of meters): in fact, it is essential that vehicles to be weighed are passing over said WIM systems 100 with all their wheels. The short side of the upper surface of said WIM systems 100 (that generally, as already said, is rectangular in shape), vice versa, is much shorter as it is preferable that it is loaded with the weight of a single axis of a vehicle when it passes there over. Furthermore the modeling of the deformations of too wide loading plates would be more complex and less suitable for weighing application (a typical width of a loading plate of a weighing system WIM according to the present invention is generally less than one meter).

Figure 2:
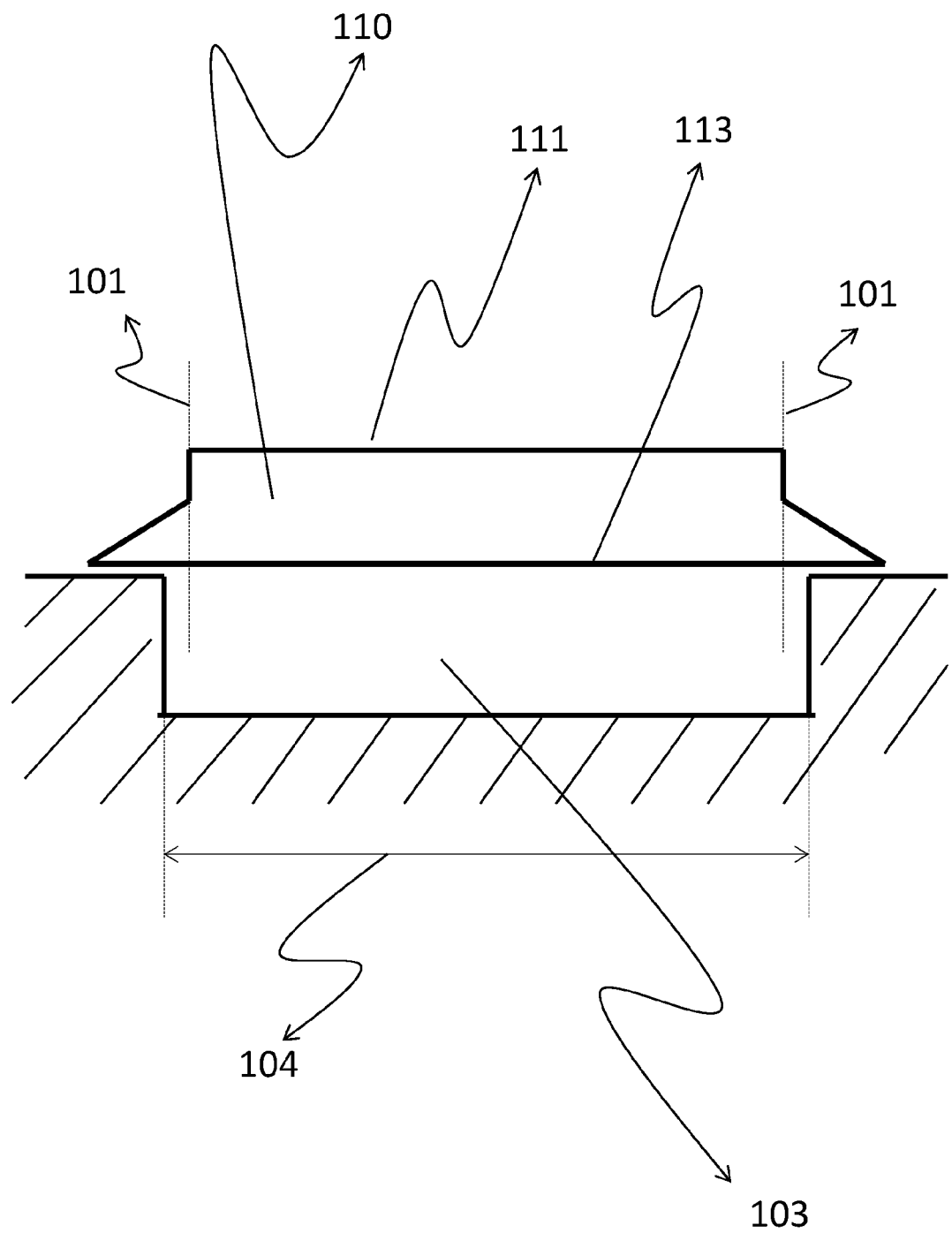
FIG. 2 shows a sectional view of the loading plate used in a WIM system according to the invention.

FIG. 2 shows a section on a plane orthogonal to an access side 102 of the loading plate of a WIM system 100.

Said loading plate is indicated in the figure with the number 110. With the number 103 it is indicated a cavity that has to be obtained in the soil underlying to said loading plate 110.

The cavity 103, being under the loading plate 110, will have a similar shape in plan view, then rectangular in shape. The long side of said cavity 103 will have a length similar to the access side 102 of the WIM system 100, while the short side will corresponds to the width of the loading plate and, as mentioned earlier, will be smaller in size. The width of the cavity 103 is indicated with the number 104.

The cavity 103, being represented in the same section orthogonal to the access side 102, is therefore shown in its minor dimension that is its width 104.

FIG. 2 puts on evidence certain specific characteristics of the profile of the loading plate 110 seen in a section orthogonal to the access side 102. In particular, the upper surface is indicated with the number 111, while the number 113 indicates the lower surface of said loading plate 110. Said lower surface 113 has to be wider than said upper surface 111. Additionally: the upper surface 111 of said loading plate 110 have a width which have to be minor than the width 104 of the cavity 103, while the lower surface 113 of the loading plate 110 have a width greater than the width 104 of the cavity 103.

This shape of the profile of the loading plate 110 seen in the section orthogonal to the access side 102 allows to said loading plate 110 to be supported by a simple support above said cavity 103. Said support takes place along the two longer edges of said loading plate 110 parallel to the access side 102. This happens because the lower part of said loading plate 110 is protruding with respect to the upper part and wider than said cavity 103, so that it can be supported without falling inside the cavity itself.

With the number 101 are indicated the two lines of the vertical projection (on the same section) of the upper surface 111 of said loading plate 110.

It is therefore evident by FIG. 2 another geometric characterizing feature of said loading plate 110. In fact the projection of the upper surface 111 of the loading plate 110 on the lower surface 113 is entirely contained in an intermediate area between the supporting areas without any overlapping with them.

Figure 3:
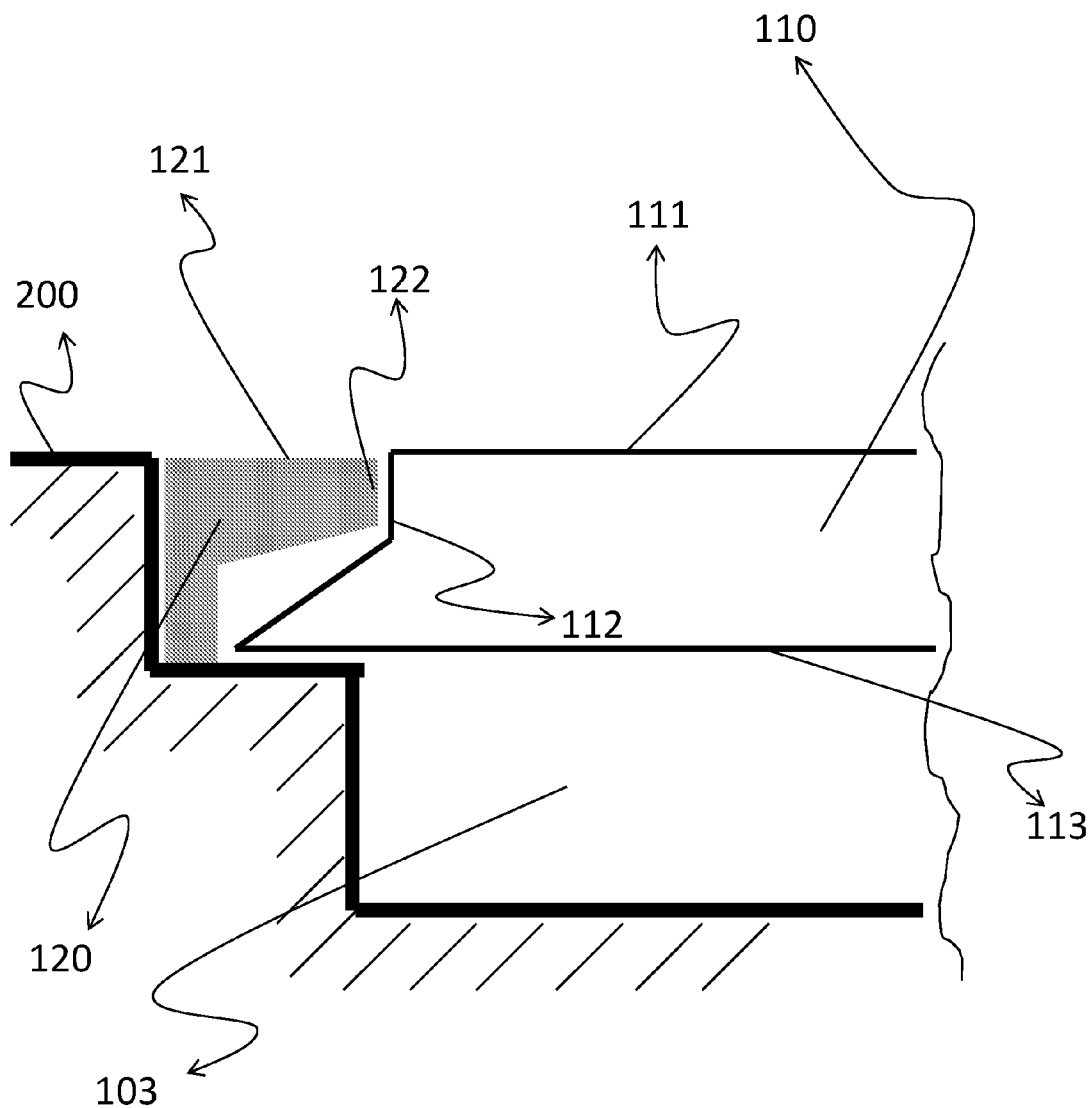
FIG. 3 shows, in section, a detail of the loading plate which highlights the mode of bond of the plate itself in the system WIM according to the invention.

FIG. 3 shows a detail of said WIM system 100, an essential representation illustrates how said loading plate 110 is constrained to the WIM system 100 as a whole.

As in the previous FIG. 2, FIG. 3 gives a representation in section on a plane orthogonal to an access side 102 of the WIM system 100. The essential details of interest are highlighted on one end of the loading plate 110 and consequently only the part of the cavity 103 below these details is represented.

It is clear that, having the WIM system 100 two access sides, everything described in FIG. 3 is symmetrically repeated also in the not shown access side.

Furthermore, in FIG. 3 it is shown with greater completeness a possible profile of the compartment in which said WIM system 100 is housed. Indeed, in addition to the shape of the cavity 103, below the loading plate 110, it is represented the profile of the housing compartment of the WIM system 100 from the cavity to the road surface 200.

With regard to the loading plate 110: of particular importance is the shape of the connecting surface between the top surface 111 and the lower surface 113 of said loading plate 110 along the side of access 102 in the WIM system 100. From the sectional representation of said connecting surface, one appreciates that it not consists simply by a plane, but rather by two planes that form an angle. The number 112 indicates the upper part of said connecting surface, which constitutes the characterizing part of the entire surface; the lower part is shown in the figure as an oblique plane, but not being distinctive it might also take a different form. A vertical plane forms said upper part 112 of the connecting surface, and the shape is suitable to couple with a constraining element of the loading plate 110 of the WIM system 100.

The number 120 indicates said coupling element which, when said dynamic WIM system is properly installed to operate, is located along a access side 102 of the WIM system 100. Said coupling element 120 is obviously represented in the same section on the same plane orthogonal to an access side 102 of the WIM system 100 and has at least two characterizing shape details:

It has a flat vertical surface, indicated with the number 122,

It has a flat horizontal surface, indicated with the number 121, which, in the limits of a reasonable mounting approximation, is coplanar both with the road surface 200 and with the upper surface 111 of the loading plate 110.

Said coupling element 120 is secured (directly or indirectly) to the road on which vehicles to be weighed are transiting, and it is mounted so that said vertical surface 122 is opposed to the vertical surface 112 of the loading plate 110, and so that it is partially overlying the lower part of the edge parallel to the access side 102 of said loading plate 110. Furthermore, the surface area of the vertical face 122 of the coupling element 120 is not greater than the area of the vertical plane 112, which is opposed, and belongs to the connecting surface between the two upper and lower faces of said loading plate 110.

This placement allows to bind with sufficient firmness the loading plate 110 to the WIM system 100. The lifting of said loading plate 110 is prevented too. In fact the coupling element 120, that overlays the long edges parallel to the access sides to the WIM system, would oppose to a removal attempt for lifting. And the movements of horizontal translation (for example in the case of braking of the vehicle passing over) are also contrasted by the opposition of the vertical surface 122 of the coupling element 120 to the vertical surface 112 of the loading plate 110.

Figure 4:
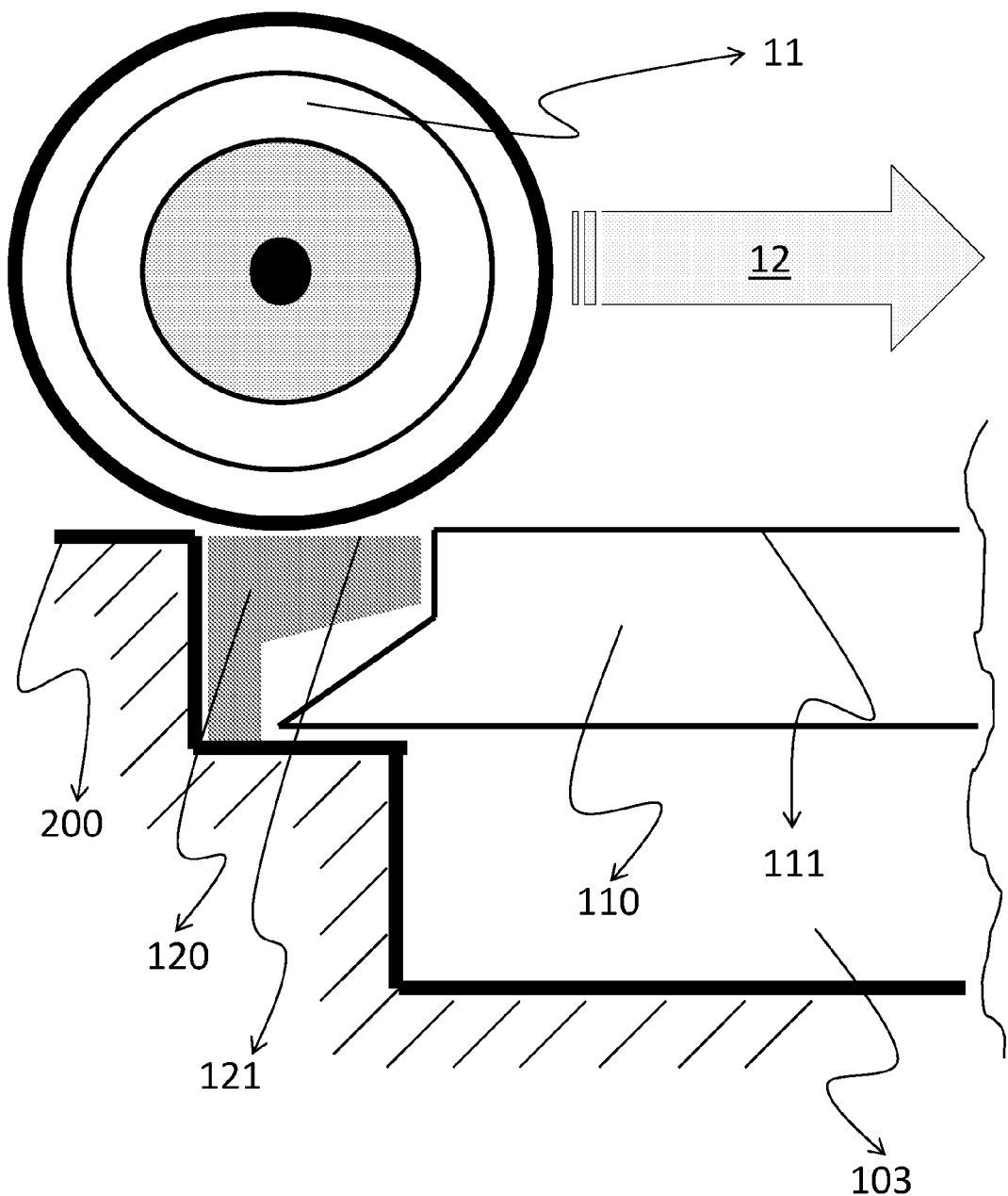
FIG. 4 shows the same view as FIG. 3 in which in a wheel of a vehicle in the process of transit on the WIM system is also depicted.

FIG. 4 shows the same view as in FIG. 3, in addition however, it is also represented a wheel of a vehicle 10 which is in transit over said WIM system 100. FIG. 4 allows to better describe a typical situation of operation of the WIM system 100.

The number 11 designates a wheel of a vehicle 10 which passes over said WIM system 100 (the relative size of the wheel represented in the figure with respect to the elements of the weighing system WIM are not significant for the purposes of the present description). The number 12 designates an arrow representing the direction of movement of said wheel 11.

Said wheel 11 then, comes from the road surface 200, in its movement approaches the WIM system 100, and passes above it entering it from the access side 102.

The weight of the vehicle 10 is transmitted, via the wheels, first on the road surface 200 and then on the WIM system 100. When the wheel enters the WIM system 100, it first passes over the horizontal surface 121 of the coupling element 120 which is coplanar with the road surface 200 and does not load the loading plate 110. It is important, at this point, to underline another function of the coupling element 120, additional to the pure function of constraint: in fact said coupling element 120 overlays the lower edge of the loading plate 110 but it is not resting on said edge, since it is firmly attached to the structure of the WIM system 100 and to the compartment in which said WIM system 100 is housed.

Continuing its motion, the wheel then enters above the top surface 111 of the loading plate 110, which is coplanar with both the road surface 200 and the horizontal surface 121 of the coupling element 120, and the weight of the vehicle 10 through the wheel 11 begins to solicit the loading plate 110. As a result of the stress from above, said loading plate 110 can deform and, in particular, it flexes downwards thanks to the presence of the cavity 103 below that does not produce any effect of reaction to the deformation.

By means of a loading plate 110 designed with the shape according to the teachings of the present invention, and constrained according to the teachings of the present invention too, it is possible to realize a WIM system 100 in which a loading plate 110 which is deformed for the application of a weight force can be modeled in such a way that the constraint of support of said loading plate 110 is a simple support and the solicitations suffered by said loading plate 110 never include vertical compression forces (i.e. a stress in which a weight force and a reaction force is acting on the same vertical axis), the effects of which are very complex to model and, inevitably, would result in differences between the simulation of the mathematical model and the real object behavior.

Figure 5:
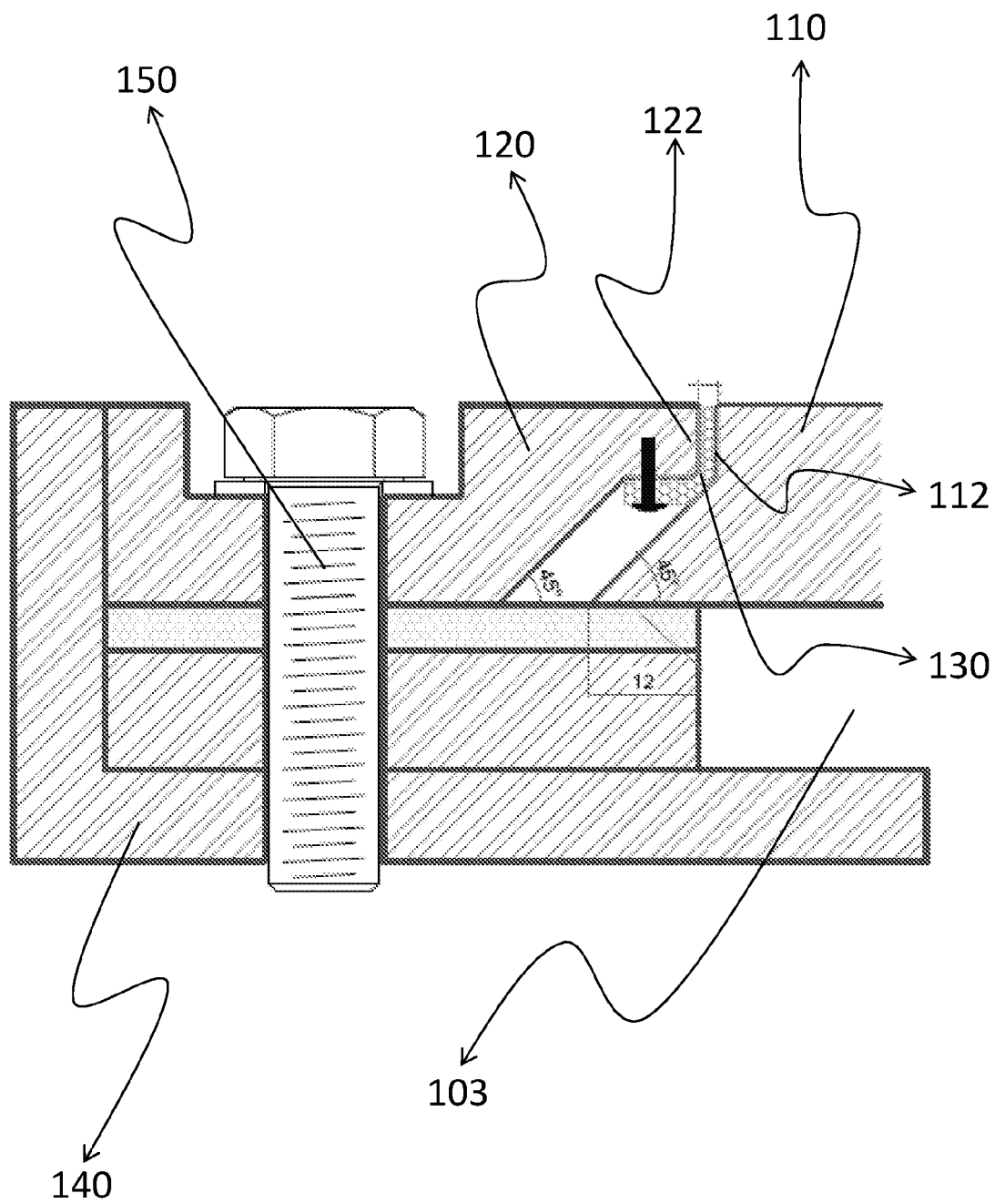
FIG. 5 shows the same detail of FIG. 3 taken from a table of real project of a WIM system according to the invention.

FIG. 5 shows the same view as FIG. 3 but, in this case, the figure is extracted from a technical design and contains, compared to previous qualitative figures, some additional details that allow to further describe a possible realistic embodiment of a WIM system 100 according to the invention.

In particular, the number 130 indicates a gasket interposed between the two vertical surfaces 112 and 122 respectively of the loading plate 110 and of the coupling element 120. The function of said gasket 130 is very important because it prevents the entry of water and other materials (e.g. topsoil, dust or small debris) in the space between the overlying coupling element 120 and the underlying edge of the loading plate 110: it is important to keep this space sufficiently clean, in order to maintain reliable, as much as possible, the assumption of the simple support of the loading plate 110, while the possible filling of the space between the coupling element and the edge of the plate may compromise this approximation.

Moreover, said gasket 130 is made of a not rigid material (e.g. EPDM—Ethylene-Propylene Diene Monomer), which allows to consider negligible the friction force between the two vertical surfaces, compared to the force exerted by the structure for support. The expediency of interposing said gasket 130 is therefore functional to make the system, composed of the loading plate 110 and its constraints, approximated as correctly as possible by a mathematical model brought back to a simple support of a plate, along its edges over a cavity.

The number 140 indicates an element of the structure of support and fastening of the entire WIM system 100. It is clear that the elements of structure and fastening can be realized in numerous ways. In the case of the project which is considered in FIG. 5, it has been chosen a structure that is adapted to be encased in a compartment in the shape of a parallelepiped, obtained on the road surface. Said structure 140, which is securely fixed to the road surface, allows, for example, to be used to secure the coupling element 120 (which, in this embodiment, has a shape very similar to that proposed in qualitative FIGS. 3 and 4). In the case of FIG. 5, the fastening of the coupling element 120 is achieved by large screws. In the section of FIG. 5, with the number 150, is represented one of these screws which allow to keep firm the coupling element 120 which, it is recalled, must be able to support the weight of vehicles in transit without compressing the underlying edge of the loading plate 110.

From what said above, it is clear that the structure which holds together said WIM system 100 may take various forms, provided that preserves the essential features of the characterizing components which are described and which allows to obtain a sufficiently deep cavity 103 so that the loading plate 110, even when flexed considerably for the passage of a very heavy vehicle, never touches the bottom of said cavity 103. In particular, the depth of said cavity 103 must be sized so as to accommodate the maximum permissible deflection to said loading plate 110, which is the deflection that, if exceeded, would result in a permanent deformation of the plate itself, making it no longer usable for the weighing application for which it is used.

The invention just described can be implemented in numerous variations that may offer additional advantages compared to those previously mentioned. Moreover, the man skilled in the art can make these further variants without departing from the invention, as it is clear from the present description and in the claims appended hereto. Therefore, it can be changed the position of some elements described; furthermore, each element can be developed in different materials, size or shape; furthermore, the invention can be realized in a partial way, as well as many details described are replaceable by technically equivalent elements.

In particular, and as already said previously, the technology of measurement of the deformations of the loading plate is not the characterizing part of the present invention and therefore, if in the future there should be available more advantageous technologies than that based on FBG sensors (currently considered the preferred technology) or, if current technologies evolve to best performance or best value for money, other types of sensors could be used in the embodiment of this invention without changing its inventive nature.

Finally, the described invention lends itself to incorporate and to support additional features in order to further improve the performance of the WIM system 100: such arrangements, not described in the present invention, will be eventually described in additional patent applications associable to this invention.

The invention claimed is:

1. A dynamic weighing system for vehicles in motion (100) comprising a substantially rectangular loading plate (110), covering the entire width of a way which the vehicles to be weighed can pass through, and wherein said loading plate (110) has the following features:
   a flat bottom face (113), substantially rectangular, having a width, along a driving direction, said width is substantially perpendicular to a width of a covered way and is greater than said width along a driving direction of its upper face (111), wherein said upper face comes in contact with a vehicle's wheel to be weighed;
   said flat bottom face (113) has two long edges which support said loading plate (110) over a cavity (103)

obtained in the ground underlying said loading plate (110), and wherein said long edges are substantially perpendicular to the driving direction of a vehicle, and wherein each of said two long edges of said loading plate (110) has a vertical projection (101) of said upper face (111) on said flat bottom face (113) and wherein said vertical projection does not intersect areas of said bottom face (113) in which said loading plate (110) is supported; and wherein the deformation of said loading plate (110) is measured to determine a weight of a passing vehicle on said loading plate (110).

2. The dynamic weighing system for vehicles in motion (100) according to claim 1, wherein said loading plate (110) has connecting surfaces on an access side (102) of said loading plate (110) between said upper face (111) and said bottom face (113); wherein said connecting surfaces are made a plane surface (112) perpendicular to said upper face (111) of said loading plate (110) and by a slanted surface forming a protruding part.

3. The dynamic weighing system for vehicles in motion (100) according to claim 1, wherein said loading plate (110), when installed and secured to a road surface (200), is also bound to said road surface (200) by means of constraint elements (120) attached to the road surface (200) itself, installed in a position adjacent to the access side (102) of the loading plate (110) and forming, in the upper part, a continuous plane formed by the road surface (200), by said constraint elements (120) and by the upper face (111) of the loading plate (110).

4. The dynamic weighing system for vehicles in motion (100) according to claim 3, wherein said constraint elements (120), when installed and secured to the road surface (200), are positioned partially overlying the protruding part of the bottom face (113) of the loading plate (110) along the access sides (102); and wherein said constraint elements (120) prevent said protruding edges of the bottom face (113) to be loaded with weight forces of a vehicle passing over said dynamic weighing system.

5. The dynamic weighing system for vehicles in motion (100) according to claim 3, wherein said constraint elements (120), when properly installed and secured to the road surface (200), each have a horizontal plane surface (121) approximately co-planar and continuous with said road surface (200), and a vertical plane surface (122) forming a right angle with said horizontal surface (121), and said vertical plane surfaces (122) of said constraint elements (120) are laid in correspondence and parallel to the plane surfaces (112) of said loading plate (110) that compose said surfaces of connection between the upper and the bottom faces of the loading plate (110); and wherein said vertical surfaces (122) have a surface area not greater than the surface of said orthogonal surfaces (112) to which they are opposed.

6. The dynamic weighing system for vehicles in motion (100) according to claim 1, further comprising a seal, made of non-rigid material, which is interposed between said vertical surface (122) of said constraint element (120) and said vertical surface (112) of said loading plate (110).

7. The dynamic weighing system for vehicles in motion (100) according to claim 1, wherein said cavity (103) is containing all components of said dynamic weighing system for vehicles in motion (100) are installed and correctly mounted, and wherein said cavity (103) is fully open below the vertical projection of said upper face (111) of said loading plate (110); and wherein said cavity (103) is deep in the ground so that the bottom of said cavity (103) does not come into contact with the bottom face (113) of said loading plate (110), even when it undergoes its maximum allowable bending down when a vehicle is transiting on the dynamic weighing system for vehicles in motion (100).

8. The dynamic weighing system for vehicles in motion (100) according to claim 1, wherein said loading plate (110) is coupled to at least one FBG (Fiber Bragg Grating) sensor for a measurement of a deformations of the loading plate (110) when a vehicle passes over it.

\* \* \* \* \*